United States Patent

Coy

[15] 3,659,797

[45] May 2, 1972

[54] TAPE DRIVE ROLLER

[72] Inventor: Don R. Coy, Palatine, Ill.

[73] Assignee: Ampex Corporation, Redwood City, Calif.

[22] Filed: Nov. 26, 1969

[21] Appl. No.: 880,306

[52] U.S. Cl. ........................242/55.19 A, 226/186, 226/191, 226/194

[51] Int. Cl. ....................................B65h 17/48, B65h 17/20

[58] Field of Search.....................242/55.19 A, 55.19, 55.18, 242/194; 226/191, 192, 194, 182, 183, 186, 187; 179/100.2 Z

[56] References Cited

UNITED STATES PATENTS

| | | | |
|---|---|---|---|
| 2,276,494 | 3/1942 | Kellogg | 226/191 UX |
| 3,285,484 | 11/1966 | Johnson | 226/191 UX |
| 3,446,410 | 5/1969 | Brose | 226/191 |
| 3,482,792 | 12/1969 | Auld | 242/55.19 A |

*Primary Examiner*—Billy S. Taylor
*Attorney*—Fitch, Even, Tabin and Luedeka

[57] ABSTRACT

A pressure or pinch member for cooperating with a capstan to transport a tape is formed with a deflectable tape engaging surface to drive the tape at a substantially constant speed without differential slippage which results in "wow," flutter or tape wear. The preferred embodiment of the pressure member is a one piece, plastic pressure roller which has a deflectable section intermediate an outer tape engaging cylindrical wall and an inner cylindrical wall for mounting on a post to replace a conventional elastomeric surfaced pressure roller of the kind used in magnetic tape cartridges.

10 Claims, 6 Drawing Figures

Patented May 2, 1972

3,659,797

2 Sheets-Sheet 1

INVENTOR
DON R. COY

Anderson, Luedeka, Fitch, Even & Tabin
ATTYS.

Patented May 2, 1972

3,659,797

2 Sheets-Sheet 2

INVENTOR
DON R. COY

Anderson, Luedeka, Fitch, Even & Tabin
ATTYS.

TAPE DRIVE ROLLER

This invention relates to tape drive systems and more particularly to pinch or pressure members for pressing a tape against a capstan for longitudinal tape transport.

In a recording or reproduction apparatus such as, for example, a magnetic tape recording or reproduction apparatus, the tape must be driven at a substantially uniform speed and without differential slippage relative to a pressure member or the capstan. In a typical magnetic tape drive system, the pressure member is an elastomeric surfaced pressure roller which forces the tape against a rotatable driving capstan which is usually a small highly polished metal cylinder. The elastomeric tape engaging surface of the pressure roller is made with sufficient compressibility that it compresses at the area of the tape and holds the tape against the driving surface of the capstan. In some instances, the elastomeric tape engaging surface is thought to actually flow about the tape and into direct contact with the capstan. While elastomeric surfaced pressure rollers perform adequately, these pressure rollers are relatively expensive and, under certain conditions, the elastomeric material becomes deleterious to the quality of sound production. Also, elastomeric surfaces on pressure rollers may wear too quickly and, hence, have a lower life cycle than is desirable.

With the present invention many of the aforementioned disadvantages, particularly as to the cost of such pressure rollers, may be overcome with a pressure roller which will mechanically deflect radially inwardly when assisting in driving the tape yet without having a compressible elastomeric surface. By deflecting the surface of the pressure roller radially inwardly, a driving couple is established to transport the tape without a differential slippage between the tape and the capstan which would result in rapid tape wear and also interfere with smooth tape transport causing high "wow" or flutter. By use of the principle of mechanical deflection of the roller itself rather than a localized compression of an elastomeric surface, it is possible to mold pressure rollers from plastic with automatic machinery at about one-fourth the cost of a conventional, commercial pressure roller having an elastomeric tape engaging surface. The commercial significance of a pressure roller which can be produced at such a reduced cost and which may be used as a direct replacement for the conventional elastomeric surface pressure roller, will be realized when it is appreciated that such pressure rollers are used in the millions for mass produced magnetic tape cartridges sold for use with tape recorders or players found in the home and automobiles.

Accordingly, an object of the present invention is to provide a pressure member of the foregoing kind.

Other objectives and advantages of the invention will become apparent from the following detailed description taken in connection with the accompanying drawings in which.

Figure 1:
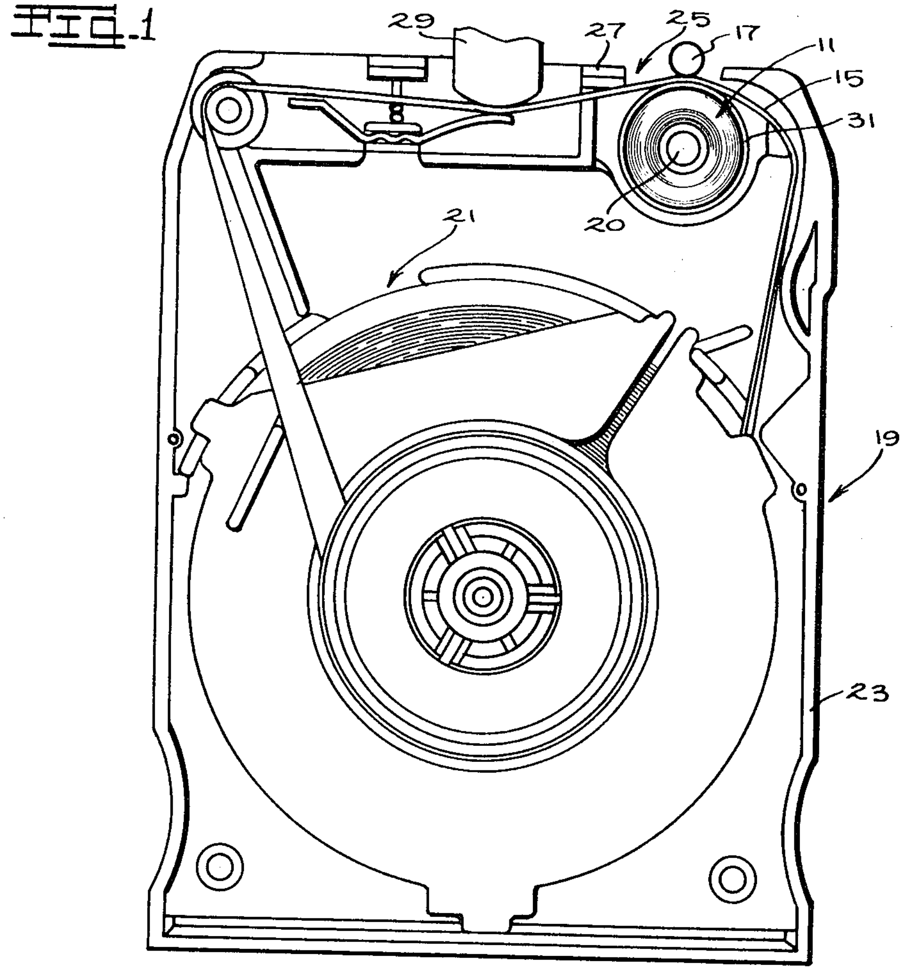
FIG. 1 is a plan view of an endless tape cartridge with a top cover removed and equipped with a pressure roller of the present invention.

As shown in the drawings for purposes of illustration, the invention is embodied in a pinch member in the form of a rotatable pressure roller 11 for exerting a pressure on a tape 15 to hold the tape in driving contact with a capstan 17. The pressure roller 11 is mounted for rotation on a post 20 in a tape cartridge 19 of a known kind in which an endless reel 21 of magnetic tape is disposed within a cartridge housing 23. The housing has opening 25 in a front wall 27 to admit the capstan to engage the tape and to exert sufficient traction to drive the tape past a sound transducer head 29 when the cartridge is in an operative playback or recording position in the player or recorder, as is illustrated in FIG. 1.

In accordance with the present invention, the elastomeric surfaced pinch roller of the prior art may be replaced with a less expensive pinch roller which is formed in a manner that an outer portion of a wall, such as a cylinder or cylindrical wall 31 on the roller is deflectable radially inward by the capstan 17 at the location of the tape 15 which is interposed between the capstan 17 and pinch roller 11. In contrast to the elastomeric covered pinch roller in conventional use which usually is made in several pieces, the pinch roller 11 may be in one piece from plastic and in a manner to deflect radially inward a portion of its outer cylinder (a portion 31*a* (FIG. 4) is diagrammatically illustrated as being deflected) so that the tape may be fed forward smoothly at a substantially constant speed without differential slippage between the tape and pinch roller as would cause "wow" or flutter. It only takes minute differential slippage, e.g., the tape being fed slower than the surface speed of the capstan, between the tape and pressure roller before the sound reproduction is adversely affected. Additionally, the magnetic tape wears considerably faster when differential slippage occurs than when the tape is fed without any substantial slippage. Heretofore, satisfactory traction was obtained at a cost sacrifice by providing outer elastomeric surfaces which are soft, compressible and resilient as contrast to the deflectable plastic pinch roller surface of the preferred pinch roller 11.

One preferred manner of achieving sufficient deflection of the cylindrical wall 31 is to make it thin in cross section and to support it by means having a hinge means or spring like member which deflects radially inward toward a central longitudinal axis 33 through the center of the pinch roller 11 when a radially directed force is applied by the capstan to the cylindrical wall. For example, the cartridge is usually urged to push the pressure roller against the capstan by a force with the range of 3 to 5 pounds. In this instance, the means supporting the outer cylindrical wall is a web 35 which has a reverse bend or hinge 37 therein between the outer cylindrical wall 31 and an inner mounting means or hub, which, in this instance, is in the form of an inner cylinder or cylindrical wall 39 coaxial with the outer cylinder. The hinge 37 acts as deflectable spring which allows the outer cylindrical wall to move radially inward and to go slightly "out of round," as diagrammatically illustrated in FIG. 4, at the portion 31*a* immediately opposite the capstan. As the pinch roller and capstan turn, successive portions of the outer cylindrical wall turn into a position for deflection by the capstan and tape 15.

Referring now in greater detail to the illustrated pinch roller 11, the latter is formed by a plastic molding process with the outer cylindrical wall 31, web 35 and inner cylindrical wall 39 integrally joined together. The outer tape engaging surface 40 of the roller may be given a suitable texture by the mold and it may not be necessary to provide any additional grinding or treatment to the tape engaging surface. In the illustrated pressure roller, the outer cylindrical wall 31 is formed with a slightly decreasing wall thicknesses at the top and bottom of the roller. More specifically, the outer tape engaging surface 40 is cylindrical while an inner surface 41 of the outer cylinder 31 tapers inwardly at an angle, e.g. about 4° to vertical. The illustrated pressure roller is about 0.545 inch in height and about 0.845 inch in diameter with a one-sixteenth inch thick outer cylindrical wall 31 at the outer edge thereof. The outer diameter of the inner cylinder 39 is about 0.344 inch and inner cylinder has a wall thickness of about 0.048 inch. These dimensions are by way of illustration and not by way of limitation.

The web 35 is preferably joined to the outer cylindrical wall 31 at a central location, i.e. approximately midway between the upper and lower edges of the roller so that forces and deflections will not be unbalanced as would cause the tape to shift vertically along the tape engaging surface 40. Also, to this same end, it is preferred that pressure be symmetrical in shape. The web 35 has an outer portion or web ring 36 inclined to the radial direction, which is a horizontal direction in the illustrations of FIGS. 4 and 5; and, in this instance, the web ring 36 is inclined at angle of about 45° and has a thickness of about 0.040 inch. An inner portion or web ring 45 is inclined in a reverse direction, i.e. downwardly, and inwardly at 45° from the hinge 37 to join the inner cylinder 39 at a location 47 which is substantially at the center of the inner cylinder 39. The inclination of the web rings 36 and 45 to the radial direction provides a less rigid construction than would a radially directed web extending normal to and between the cylinders 31 and 39.

To provide additional flexibility, the hinge 37 is formed with a reduced cross sectional thickness as compared to the inner and outer web rings 36 and 45 and has an annular groove 49 with converging and sloping side walls 51 and 53 (FIG. 5) which meet at a rounded concave wall 55 opposite an outer convex wall 57 at the top of the reverse bend. A deflection of the outer cylinder at a portion 31a will cause the web ring 36 to bend inwardly and narrow the gap between the side walls 49 and 51 on opposite sides of the groove 49. As the pressure roller continues to turn the portion of the groove 49 previously narrowed is again widened to its usual width due to the resiliency of the plastic while another trailing portion 31a is being deflected inward.

Figure 2:
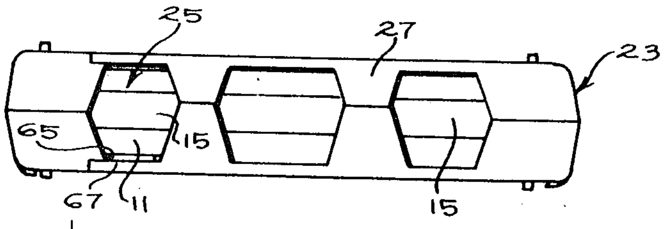
FIG. 2 is a front view showing access openings in the tape cartridge.
Figure 3:
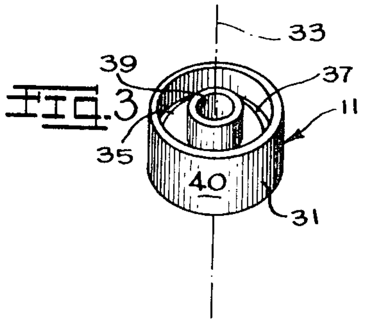
FIG. 3 is a perspective view of a pressure roller constructed in accordance with a preferred embodiment of the invention.

For rotatably mounting the pressure roller on the post 20, the inner cylinder 39 has longitudinally extending bore 59 of substantially uniform diameter to telescopingly receive the supporting post 20 on the cartridge. Preferably, a slight inward bevel 63 is provided at the top and bottom of the cylindrical wall defining the bore 59. The inner cylinder 39 is slightly longer than the length of the outer cylinder 31 with the bottom edge of the outer cylindrical wall spaced upwardly from the cartridge when a bottom edge 65 on the inner cylinder rests on a support surface 67 (FIG. 2) adjacent the bottom of the post 20. The size relationships of the bore 59 and the post 20 is such that the pressure roller will rotate readily but does not become canted or misaligned relative to a vertical axis through the post 20.

Good results have been achieved with pressure rollers 11 molded from a plastic such as, for example, Celanese CDY-246 which is a thermoplastic resin sold by Celanese Corporation. Other plastics may be used such as polypropylene; the preferred plastics being those which will withstand a relatively high temperature environment and have a wear rate and a sufficient length of life, e.g. a life sufficiently long that the tape 15 will wear out before the pressure roller 11 wears out. By use of a suitable low cost plastic material such as polypropylene and by molding the one-piece pressure roller so that it requires little or no subsequent machining or grinding, the cost of these pressure rollers in large quantities may be reduced to about one quarter or less than the now conventional pressure rollers having elastomeric surfaces in present use in tape cartridges. The tape engaging surface 40 of the outer cylinder 31 is in the illustrated and described embodiment of the invention formed with a matte type surface resulting from being made in a mold having a vapor hone finish. It is to be understood, however, that the present invention is not limited to the use of only plastic materials for the pressure roller as it is contemplated that by the pressure roller could by made of metal, or a mixture of plastic, inorganic, or metallic materials to achieve a similar deflection of the tape engaging wall opposite the capstan during tape feeding as contrasted with the compression and expansion of an elastomeric surface. The preferred plastic rollers appear to have a relatively linear rate of deflection characteristic of a mechanical deflection.

Figures 4, 5, 6:
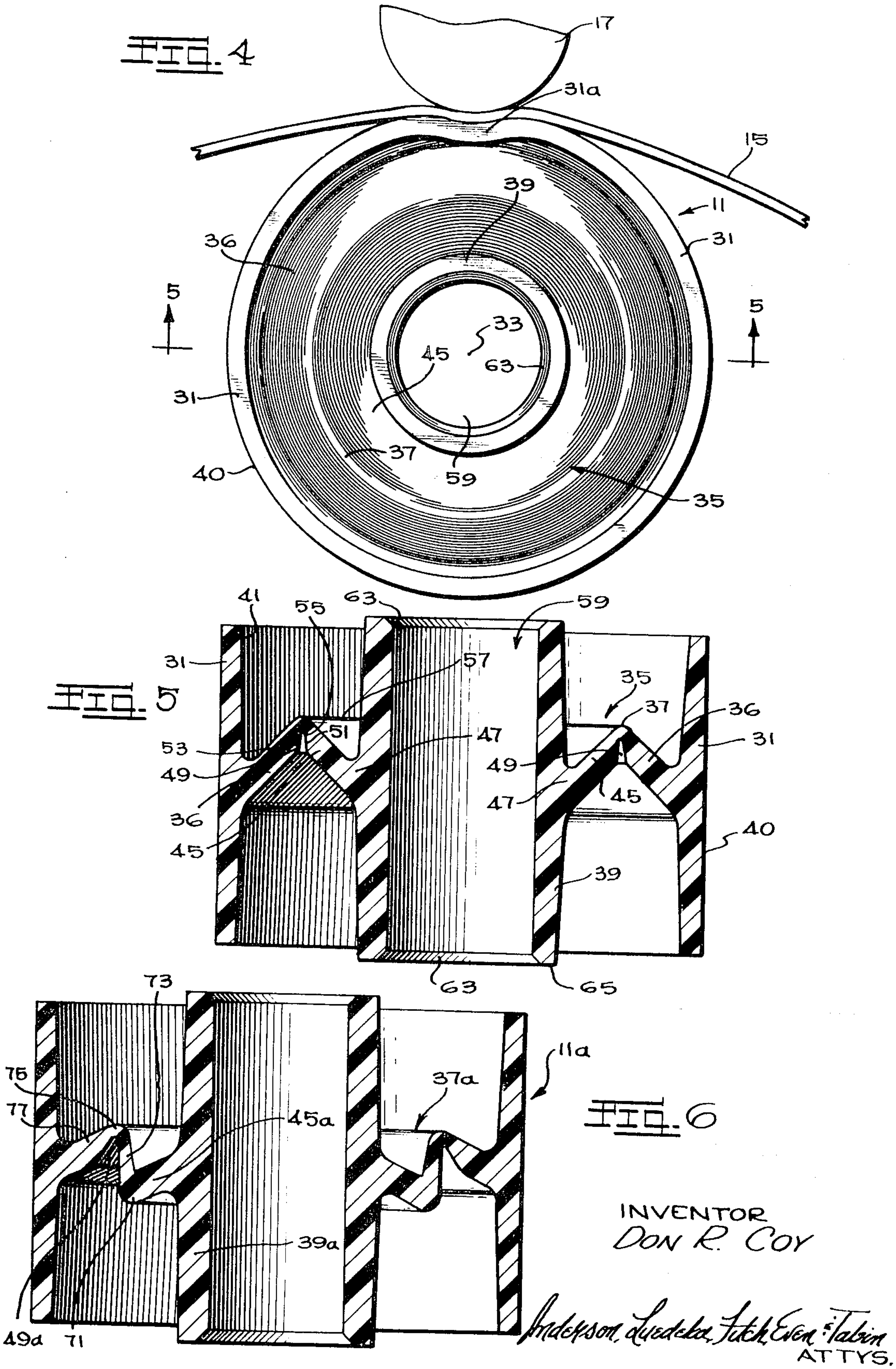
FIG. 4 is an enlarged, fragmentary, diagrammatical plan view of a pressure roller and capstan.
FIG. 5 is a sectional view taken along line 5—5 of FIG. 4.
FIG. 6 is a sectional view of a pressure roller constructed in accordance with another embodiment of the invention.

In accordance with another embodiment of the invention, a pressure roller 11a, illustrated in FIG. 6, is provided with a web 35 and with a hinge means 37a which is different in construction from the hinge means 37 described above in connection with the pressure roller 11. Similar reference characters with a suffix a are used to designate elements similar to those described in connection with the roller 37. With the exception of the difference in the hinge means, the rollers 11 and 11a are otherwise substantially identical.

The hinge means 37a for the roller 11a is formed with an inner web ring 45a which extends downwardly and inwardly from an inner cylinder 39a and is integrally joined at a shoulder 71 to a upwardly inclined hinge wall 73 which is connected at an upper convex portion 75 to another hinge wall 76 connected to an outward web ring 36a. An upwardly opening groove 49a is also provided to enhance flexing of the hinge wall 73 to narrow the groove 49a at a localized area opposite the capstan 73. With such a narrowing, the upper part of the hinge wall 73 may also be flexed inwardly about the lower thicker shoulder 71 and toward the inner cylinder 39a. Thus, it will be seen that the hinge means may take several shapes and forms including those illustrated and described herein.

It will be seen from the following that a pressure roller may be constructed without the use of an elastomeric surface by providing a deflectable characteristic to the pressure roller. A substantial savings in the cost of the pressure roller is achieved by molding a one piece pressure roller from a plastic material formed to provide the desired deflection necessary for tape transport without substantial differential slippage. By means of a hinge connection between an outer tape engaging cylinder and an inner cylinder, good deflection may be obtained in a simple inexpensive design of pressure roller.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. In a tape transport system having a transducer head and a tape driving capstan, a pinch member of plastic material for engaging the tape and for exerting a pressure thereon to hold the tape in driving contact with said capstan, support means for supporting said pinch member, an outer plastic tape engaging surface on said pinch member for engaging the tape, and a deflectable web means integral with said tape engaging surface and intermediate said tape engaging surface and said support means and having a hinge area therein about which another portion of the web means deflects toward said support means with an exertion of pressure on said tape engaging surface of said pinch member by said capstan and tape, said web means having a cross-sectional thickness substantially less than the longitudinal extent of said tape engaging surface.

2. A cartridge having a reel of magnetic tape for movement along an endless path, a cartridge housing having an opening in one end thereof, a rotatable pinch roller supported in the cartridge adjacent said opening, and a loop of tape about said pinch roller for engagement with a tape capstan, mounting means in said cartridge for mounting said pinch roller for rotation, said pinch roller being one piece and made of molded plastic material, an inner cylindrical wall on said pinch roller mounted on said mounting means for rotation, an outer cylindrical wall on said pinch roller having a surface for engaging said tape, and a deflectable web means integral with an extending between said inner and outer cylindrical walls and having a hinge area therein about which another portion of the web means deflects with radially directed pressure from said tape at said capstan to allow said outer cylinder wall to deflect radially inward for tape transport, said web means having a cross-sectional thickness substantially less than the longitudinal extent of said tape engaging surface.

3. A cartridge having a reel of magnetic tape for movement along an endless path, a cartridge housing having an opening in one end thereof, a rotatable pinch roller supported in the cartridge adjacent said opening, and a loop of tape about said pinch roller for engagement with a tape capstan, mounting means in said cartridge for mounting said pinch roller for rotation, an inner cylindrical wall on said pinch roller mounted on said mounting means for rotation, an outer cylindrical wall on said pinch roller for engaging said tape, and means integral with an extending between said inner and outer cylindrical walls for deflecting with radially directed pressure from said tape at said capstan to allow said outer cylinder wall to deflect radially inward for tape transport, said pinch roller being formed in one piece and of plastic material and said connecting means being in the form of a web having portions which are disposed obliquely to the radius of the cylinder generated by said outer cylindrical wall.

4. A cartridge in accordance with claim 3 in which said web has a first portion fixed to said outer cylindrical wall and extending inwardly and at an angle to the radial direction and a second portion reversely directed and extending inwardly to said inner cylindrical wall.

5. A cartridge in accordance with claim 4 in which said first and second web portions are joined to said inner and outer cylindrical walls substantially at the center portions thereof.

6. A one piece pinch roller for pressing a tape against a drive capstan to transport the tape comprising an outer cylindrical wall having a surface for engaging the tape and maintaining a pressure thereon, an inner cylindrical wall spaced inwardly of and disposed within the circumference of said cylindrical wall for mounting said roller for rotation, and a deflectable web means integral with and intermediate said cylindrical wall and said means for mounting said roller and having a hinge area therein about which another portion of the web means deflects with a radially directed load to allow the portion of said outer cylindrical wall engaging the tape to deflect inwardly from the remainder of the cylindrical wall, said web means having a cross-sectional thickness substantially less than the longitudinal extent of said tape engaging surface.

7. A pinch roller for pressing a tape against a drive capstan to transport the tape comprising a cylindrical wall for engaging the tape and maintaining a pressure thereon, means disposed within the circumference of said cylindrical wall for mounting said roller for rotation, and deflectable means intermediate said cylindrical wall and said means for mounting said roller for deflecting with a radially directed load to allow the portion of said cylindrical wall engaging the tape to deflect inwardly from the remainder of the cylindrical wall, said means for mounting said roller comprising a cylindrical wall, said deflectable means being an annular web, said web being disposed substantially centrally of said inner and outer cylindrical walls, and a reverse bend hinge being formed therein.

8. A pinch roller in accordance with claim 7 in which said reverse bend hinge includes an outer ring and inner ring inclined in opposite directions and further includes an area of reduced cross sectional thickness.

9. A pinch roller in accordance with claim 8 in which an annular groove is formed in said web at said hinge.

10. A pinch roller in accordance with claim 6 in which said roller is molded from a plastic material.

* * * * *